Nov. 18, 1952  E. TRAVIS  2,618,238
FEEDING DEVICE
Filed Sept. 5, 1950
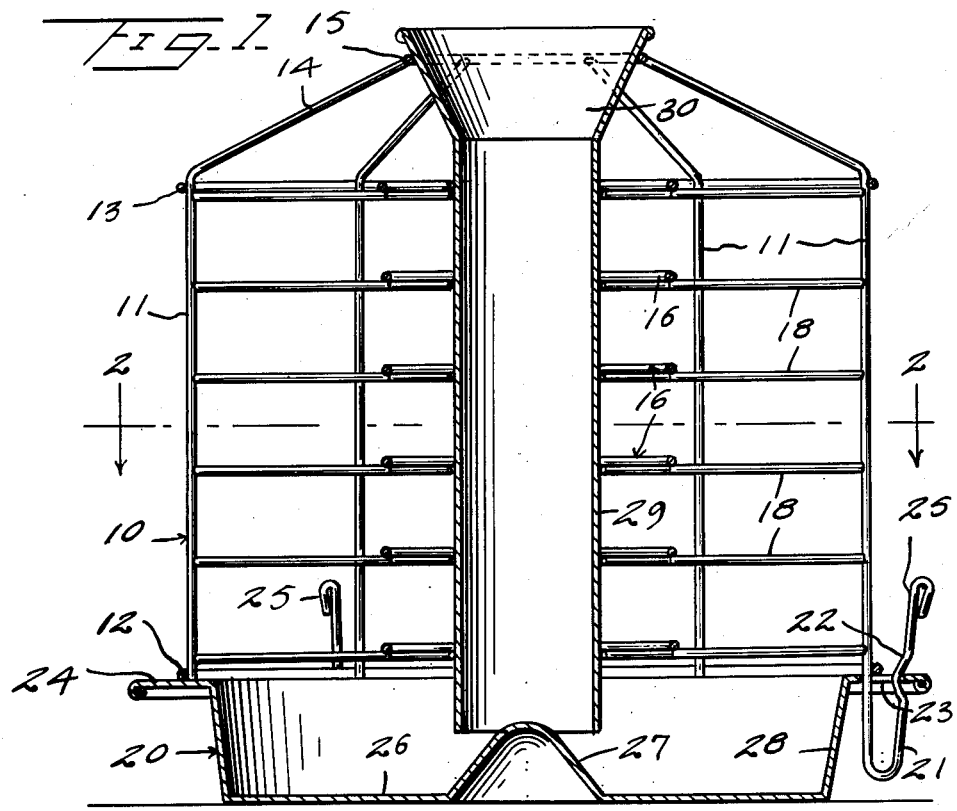
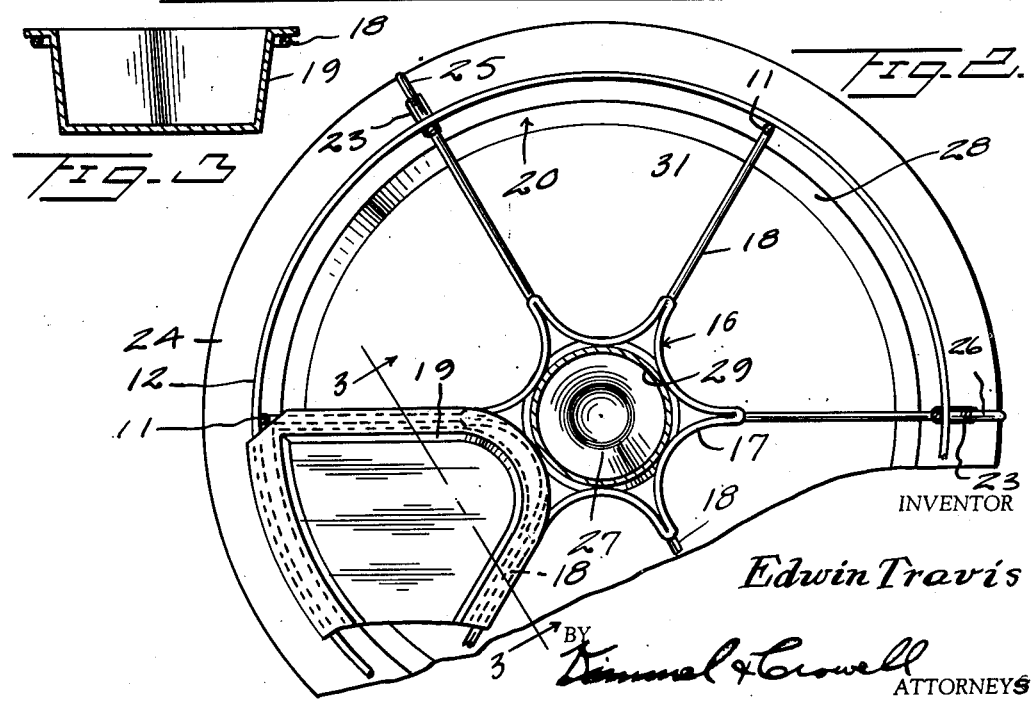
INVENTOR
*Edwin Travis*
BY
*Kimmel & Crowell*
ATTORNEYS Patented Nov. 18, 1952

2,618,238

UNITED STATES PATENT OFFICE 2,618,238

FEEDING DEVICE

Edwin Travis, Peekskill, N. Y.

Application September 5, 1950, Serial No. 183,163

1 Claim. (Cl. 119—52)

This invention relates to a feeding apparatus and is an improvement over the feeding structure embodied in my prior Patent 2,254,585, issued September 2, 1941.

An object of this invention is to provide an improved feeding device for animals, such as dogs, including puppies and grown dogs of various sizes and breeds which is so constructed that the animals may readily feed without interference one from the other and without upsetting the feed trap or receptacles.

Another object of this invention is to provide a device of this kind which includes a detachable lower tray or receptacle adapted to receive semi-liquids or liquid material which can be obtained from any one of the several compartments formed by the skeleton-like supporting structure.

A further object of this invention is to provide in a device of this kind a funnel-shaped material conducting member which is removably carried by the upper portion of the frame structure for discharging liquids or semi-liquids into the bottom or base tray.

With the above and other objects in view, my invention consists in the arrangement, combination and details of construction disclosed in the drawings and specification, and then more particularly pointed out in the appended claim.

In the drawings:

Figure 1 is a vertical sectional view of a feeding device constructed according to an embodiment of this invention.

Figure 2 is a fragmentary sectional view taken on the line 2—2 of Figure 1.

Figure 3 is a sectional view taken on the line 3—3 of Figure 2.

Referring to the drawing, the numeral 10 designates generally a skeleton-like cage or frame structure which is formed of a plurality of circumferentially spaced upright bars 11 connected at the lower ends to a lower ring 12 and connected at their upper ends to an upper ring 13. The upright bars 11 include upwardly and inwardly directed extensions 14 which are secured at their inner ends to an upper funnel supporting ring 15.

A plurality of vertically disposed star-shaped members generally designated as 16 are disposed within the frame structure 10, and each star-shaped member 16 is formed of a single strand of wire having connected together inwardly curved bars 17 as shown in Figure 2. The points of the star-shaped members 16 are connected to the uprights 11 by means of radially disposed connecting bars 18, and the bars 18 with the curved bars 17 form supporting means for supporting flanged sector-shaped trays or receptacles 19. A bottom tray or base generally designated as 20 is detachably secured to the frame 10 by means of resilient latching members 21 which are formed as an integral part of certain ones of the upright bars 11. The latching members 21 are of substantially U-shape being formed with an offset 22 which is adapted to latch into a notch 23 formed in the rim or upper flange 24 of the base 20. The latching member 21 includes an upwardly projecting arm 25 which extends above the rim 24 so that the latching member 21 may be pressed inwardly to a released position. The base tray or receptacle 20 includes a bottom wall 26 which is formed with an upwardly offset cone-shaped central divider or spreader 27 and is also formed with an upwardly flared side wall 28.

A tubular feed conducting member 29 extends downwardly through the spider members 16 and has the lower end thereof positioned slightly below the apex of the spreader 27. The upper end of the tubular member 29 is formed of a flared or funnel-shaped member 30 which removably engages within the upper supporting ring 15.

In the use and operation of this device, the desired material which may be water, semi-liquid feed or the like, is discharged into the base tray 20 through the funnel 30 and the conducting tube 29. Where the material is of semi-liquid condition the spreader 27 will evenly spread the material about the bottom 26. The outwardly divergent spider supporting bars 18 form compartments 31 within selected ones of which the trays 19 may be positioned. These trays 19 may be disposed at selected heights within the frame structure 10 and may be positioned circumferentially about the skeleton frame 10 so that the animals in obtaining feed from the trays 19 will not agitate one another and will not disturb one another in obtaining the feed. By providing the releasable latching means for the frame 10 with respect to the base tray 20, the latter can easily and quickly be cleaned or may be filled with the desired material without discharging the material through the funnel 30.

What is claimed is:

A feeding device for puppies and grown dogs, comprising an open hollow base constituting a feed holder, an annular horizontal flange about the top of said base having a plurality of radial slots therethrough, an annular upstanding body comprising a plurality of spaced superposed star-shaped wire members, a tubular member having a funnel-shaped top extending vertically within said star-shaped member to a point adjacent said holder, a plurality of vertical wire supports spaced radially of the points of said star-shaped members connecting wires extending horizontally between said supports and the points of said star-shaped members, upper and lower circular rings extending about said supports, said lower ring seating in said flange, said supports overlying said flange, downwardly extending portions on certain of said supports, said portions being reverted to form resilient latch members and aligned with said slots for engagement therewith, and detents formed in said reverted portions for engagement with the end portions of said slots resiliently to secure said body portion to said base in readily releasable relation.

EDWIN TRAVIS.

REFERENCES CITED

The following references are of record in the file of this patent:

UNITED STATES PATENTS

| Number | Name | Date |
| --- | --- | --- |
| 2,254,585 | Travis | Sept. 2, 1941 |
| 2,520,725 | Judd | Aug. 29, 1950 |